United States Statutory Invention Registration [19]

[11] Reg. Number: H286

Kanter [43] Published: Jun. 2, 1987

[54] MODULAR GLOW/CORONA DISCHARGE DEVICE

[75] Inventor: Ira E. Kanter, Monroeville, Pa.

[73] Assignee: The United States of America as represented by the Secretary of the Army, Washington, D.C.

[21] Appl. No.: 891,665

[22] Filed: Aug. 1, 1986

[51] Int. Cl.[4] ..... B03C 3/04; H01T 23/00

[52] U.S. Cl. ..... 55/141; 361/230

*Primary Examiner*—Stephen C. Buczinski
*Assistant Examiner*—Linda J. Wallace
*Attorney, Agent, or Firm*—Anthony T. Lane; Harold H. Card, Jr.; Michael C. Sachs

[57] ABSTRACT

A glow/corona discharge device for use in detoxifying air at atmospheric pressure. The device includes a generally cylindrical supporting structure with a plurality of self-contained modular discharge units (or power packs) mounted around the surface thereof. Each module contains a flow channel in which the electrical discharge is maintained and through which the air being processed is passed. The modules are designed for ease of inspection and maintenance and include a plurality of ballast resistors each in series with an adjustable cathode pin. The flat anode plate is located on the opposite side of the flow channel from the cathode pins.

6 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MODULAR GLOW/CORONA DISCHARGE DEVICE

The Government has rights in this invention pursuant to contract DAAA09-82-C-5396, awarded by the Department of the Army.

BACKGROUND OF THE INVENTION

This invention relates to an electrical discharge device in which a glow/corona discharge is produced in air at atmospheric pressure. Such a device is useful in decontaminating air by removing certain chemicals therefrom. The device of the present invention can be used in conjunction with other types of filters, for example a gas filter and/or a particulate filter to provide a versatile and effective hybrid filter unit capable of removing many contaminants and toxic materials from the atmosphere. Such filters are capable of providing from 100 to 600 cubic feet per minute of filtered and detoxified air, or any larger multiple thereof.

Glow/corona discharge devices have been used in the prior art for purging toxic chemicals and other substances from the air; however, these prior art devices have been designed for a specific set of operating conditions. For example, for a particular application the desired gas flowrate, input gas composition, pressure, the electrical field strength and electrode configuration are interrelated to arrive at a fixed glow discharge volume which determines the system design and capacity. Any large change in any of these design criteria , particularly a substantial change in flowrate, requires a new design.

Military glow/corona discharge devices used in the field for detoxification or emission control require versatile designs capable of a wide range of flowrates. Also, military equipment for field use must be easy to maintain and be highly reliable. These design criteria were followed in the making of the present invention.

SUMMARY OF THE INVENTION

The novel glow/corona discharge device of the present invention is constructed in a sectional or modular manner whereby different numbers of modules may be connected in parallel to achieve several different flowrates, thus permitting the accommodation of numerous filtering requirements or applications. The modules (or discharge units) are all self-contained glow/corona discharge units which are mounted around the perihery of a generally cylindrical structure called the anode housing. Each of the modules contains a flow channel in which the electrical discharge is maintained, and through which the air being processed is passed. These flow channels are parallel to the longitudinal axis of the anode housing. Also, two or more of these discharge devices may be arranged in series to increase the processing or detoxification capacity thereof.

The modules are of sub-modular construction for ease of maintenance and repair. The sub-modules comprise a power unit composed of ballast resistors, a pin mount unit which comprises the pins which function as cathodes, and an anode unit; all sandwiched together and secured by bolts and nuts or other fasteners for easy disassembly and assembly.

It is thus an object of this invention to provide a modular glow/corona discharge device which can be arranged for different flowrates and which comprises modular discharge units.

A further object of the invention is to provide an electrical discharge device for the detoxification of atmospheric air which comprises modular glow/corona discharge units which can be operated in parallel to achieve a flowrate dependent on the number of such paralleled units and wherein said modular discharge units are all self-contained and are composed of sandwiched sub-modules which can be easily maintained, inspected and repaired.

Another object of the invention is to provide an electrical discharge device comprising a plurality of self-contained modular discharge units which can be mounted around the periphery of a generally cylindrical supporting structure to provide different amounts of glow/corona discharge volume depending on the number of such modular units so mounted, and wherein said modular units are of submodular construction comprising ballast resistors, a pin mount unit containing cathode pins, an anode plate, with a flow channel between said pins and said anode plate.

These and other objects and advantages of the invention will become apparent from the following detailed description and the drawings.

DETAILED DESCRIPTION OF A PREFERRED EMBODIMENT

Figure 1:
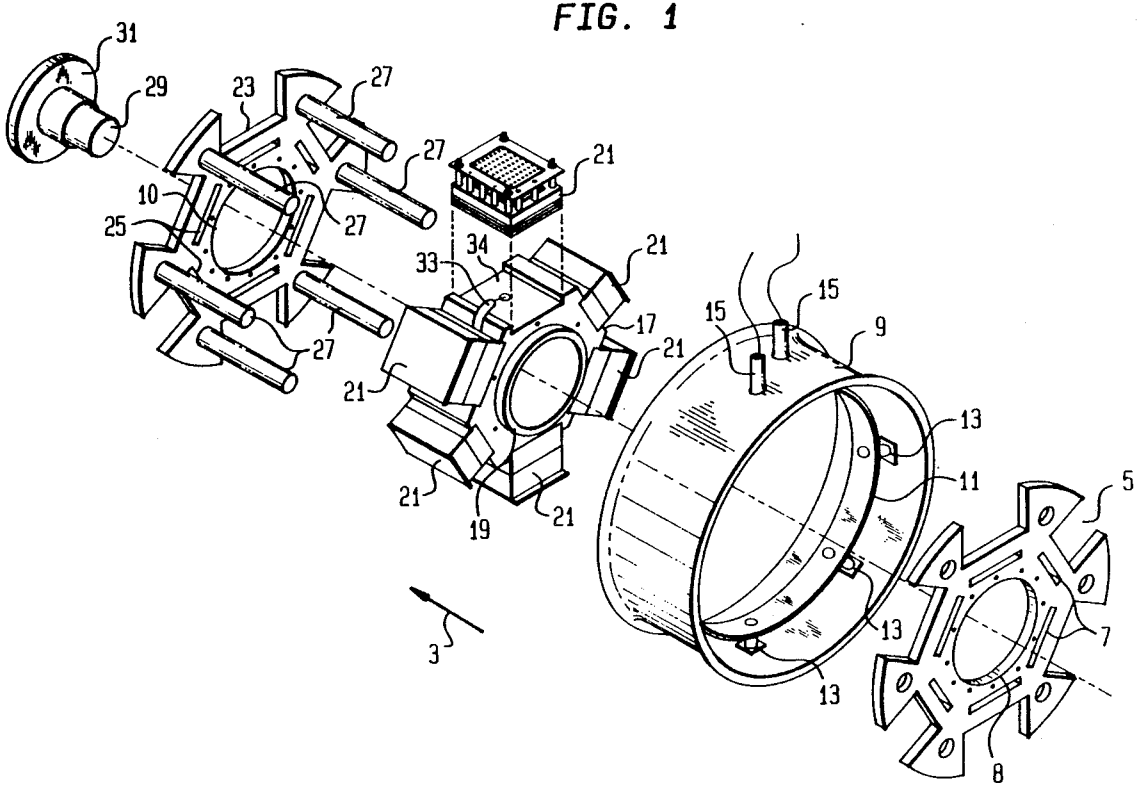
FIG. 1 is an isometric, exploded view of a preferred embodiment of a glow/corona discharge device according to the present invention.

The modular discharge device shown in FIG. 1 is part of a large, skid-mounted hybrid filter unit which, as stated above, may also include a gas filter and a particulate filter (neither of which are shown in the drawings). These two filters plus the illustrated modular discharge device are all connected in series. The arrow 3 of FIG. 1 shows the direction of air flow through the device.

The device of FIG. 1 comprises anode housing 17 which is generally cylindrical with an axial hole 19 and with six flat surfaces, such as 34, symmetrically located around its periphery and designed to accommodate the mounting of six modular glow/corona discharge units (or power packs), 21. Each of the power packs includes a flow channel extending along its longer dimension. The flow channel comprises the space between the cathode pins and the flat anode plate. The electrical discharge occurs in the flow channel and the air being processed passes through it. The flow channels are of rectangular cross-section. The anode housing 17 is sandwiched between a pair of support plates 5 and 23, which are secured to each other by means of six support rods 27. The plates 5 and 23 each include six rectangular holes, 7 and 25 respectively, which are the same size as the rectangular cross-section of the flow channels of the power packs. These rectangular holes are lined up with the power packs so that the input air will be directed through the electrical discharge volume (or the flow channels) of the modular power packs and thence toward the hybrid filter output.

Both the support plates also include central holes, 8 and 10, which are lined up with the axial hole 19 of the anode housing.

The anode ring 29 is centrally attached to a portion 31 of an exit gas diffuser (not shown), which forms the next assembly on the downstream side of the modular discharge device. The anode 29 fits into the axial hole 19 in the anode housing 17 and has the positive power cable 33 attached thereto. When the device is assembled, the six anode leads radiate from the anode ring to the six anode plates of the power packs. These anode leads pass through the anode housing.

The cylindrical shell 9 provides an outer housing for the anode housing and the power packs mounted thereon. Running around the inside of the shell 9 is the conductive cathode ring il, mounted by means of insulating stand-offs 13. The negative high voltage lead is connected to the cathode ring and the cathode ring is in turn connected to the outer printed circuit board of each power pack. The outer circuit board has one terminal of each of the ballast resistors connected thereto. The positive and negative supply leads 15, which are connected internally to the anode and cathode rings, as explained above, are connected to an external high voltage power supply (not shown) capable of providing an adjustable DC voltage in the vicinity of 10. Kilovolts.

Figure 2:
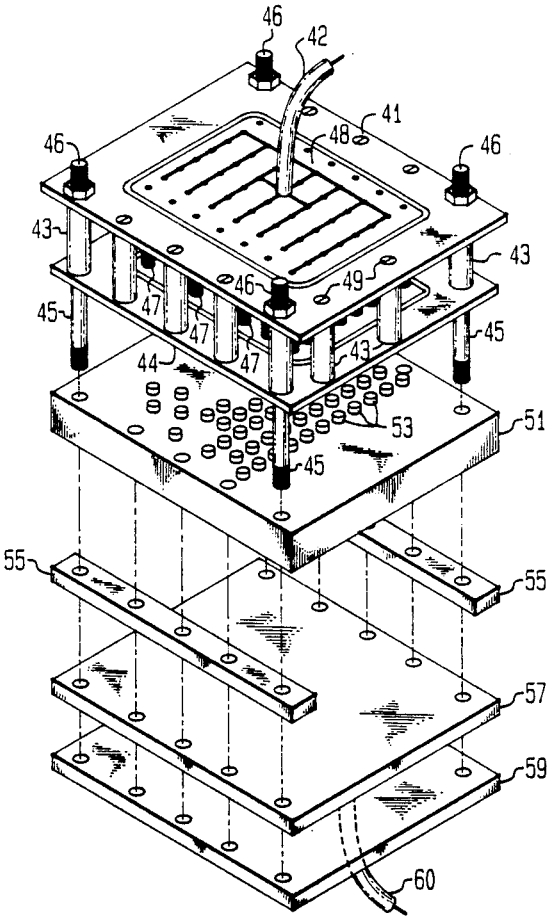
FIG. 2 is an exploded view of one of the modules(or discharge its), showing the sub-modular construction thereof.

The power pack (or discharge unit) of FIG. 2 comprises a pair of flat printed circuit boards 41 and 44 which are held together by several spacing rods, such as 43, which are arranged around the edges of the boards 41 and 44, and are secured by screws such as 49. Insulating studs, such as 45, at each corner of this assembly hold the entire module together and are secured by nuts, such as 46. The high voltage ballast resistors 47 are mounted between the printed circuit boards and normal thereto. These metal alloy resistors are designed to operate at temperatures in excess of 200° C. and the circuit boards are made of an insulating material such as Westinghouse FR-4 fire retardant material. The lead 42 is the negative high voltage lead which is connected to the cathode ring 11 when the device is assembled. This lead is in turn connected to the upper terminal of each of the ballast resistors through the conductive paths 48 on the upper circuit board 41. The two circuit boards and the ballast resistors together comprise the power unit.

One ballast resistor is provided for each of the cathode pins, which are all separately adjustable and are mounted in the pin mount unit or board 51. The pin caps 53 are shown on the top surface of the pin mount unit. These caps are lined up with and contact a different one of the lower terminals of the ballast resistors. The pin mount unit transfers the high voltage from each of the ballast resistors to a separate cathode pin. The cathode pins project out of the bottom of unit 51 into the flow channel which comprises the space between unit 51 and flat anode plate 57. The rails or spacers 55 define the thickness of the flow channel. The insulated base 59 is mounted beneath the anode 57. The anode lead 60 connects the anode plate 57 to the anode ring 29, as shown in FIG. 1.

Figure 3:
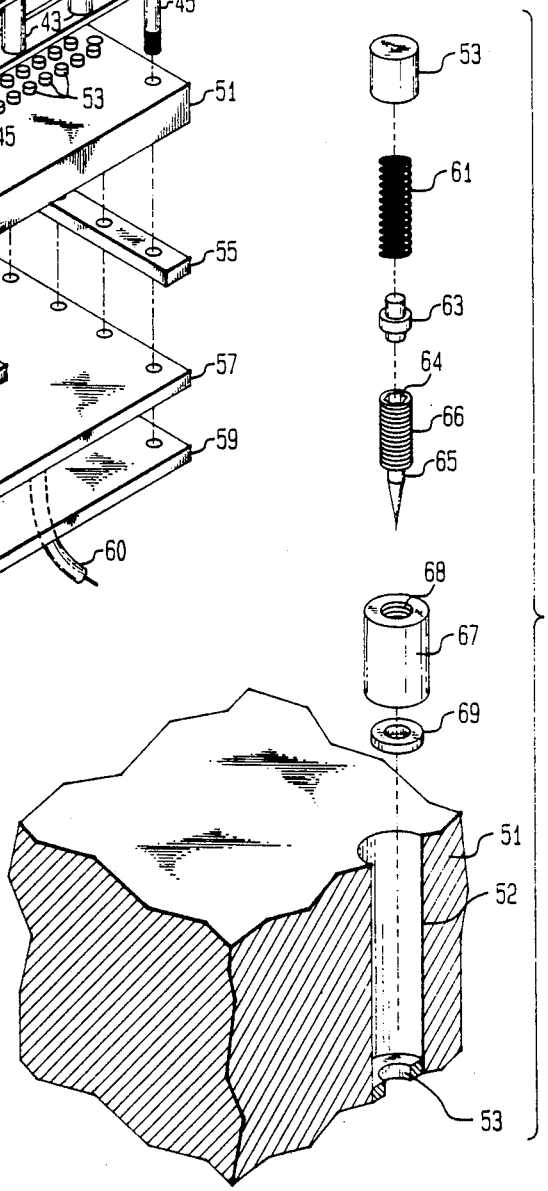
FIG. 3 is an exploded view of a portion of the pin mount unit of FIG. 2, showing how the cathode pins are mounted.

FIG. 3 shows how each of the cathode pins are mounted in the insulated pin mount unit 51. The unit 51 has a large diameter hole 52 and a concentric smaller diameter hole 53 big enough for the pin tip to project through. First the Teflon washer 69 is inserted in hole 52 and hollow insert 67 is then forced into the same hole and expanded so that it becomes locked in place and effects a hermetic seal. The pin assembly comprises pin 65 which has an integral externally threaded cylindrical portion 66 which has a hexagonal hole 64 in the top thereof. The pin assembly is screwed into the internally threaded (68) insert 67 and its position adjusted by means of an Allen wrench inserted into hole 64. The hole 64 is large enough to receive the lower portion of spring guide 63. The spring 61 fits over the upper portion of guide 63 and the hollow cap 53 fits over the upper end of the spring. This spring-loaded arrangement allows for positive connection between the resistors and the cathode pins in case of misalignment, thermal displacement or vibration. Also, the screw-mounted pins permits discharge gap adjustment.

This design of the power packs permits easy inspection and replacement of faulty components. The ballast resistors can be easily visually checked for damage and electrically checked with an ohmmeter. Also, the cathode pins can be similarly visually checked and separately replaced if necessary.

The illustrated modular glow/corona discharge device with all six discharge units in place can process 600 cubic feet of air per minute. Thus each of the power packs has a capacity of 100 cfm, and, as stated above, less than six of the power packs can be installed for applications requiring smaller capacity. Also, greater capacity can be achieved by utilizing an anode housing with additional flat mounting surfaces, for example, an 8 or 12 sided housing could be used to mount up to 12 power packs to achieve up to 1200 cfm capacity.

Also, the capacity and effectiveness of the electrical discharge in detoxifying the air can be varied by changing the number of cathode pins and/or adjusting the positions thereof. These factors determine the amount or the numbers of chemically active species produced and hence affect the ability of the device to purge undesired chemicals from the air being processed. Certain applications may require that large volumes of air be passed through this device, which air is only slightly contaminated with chemical agents. In that case, all six of the power packs would be installed but the number of cathode pins could be reduced since the rquired amount of chemical activity would be small. This would reduce the power consumption of the device and extend the life of the cathode pins and the resistors.

While the invention has been described in connection with illustrative embodiments, obvious variations therein will occur to those skilled in this art without the exercise of invention, accordingly the invention should be limited only by the scope of the appended claims.

What is claimed is:

1. A modular glow/corona discharge device for detoxifying air; comprising, a generally cylindrical supporting structure having a plurality of self-contained modular discharge units mounted on the surface thereof, and wherein said modular units are of submodular construction comprising a plurality of ballast resistors each of which is separately connected to a different cathode pin, an anode plate on said supporting structure, the space between said cathode pins and said anode plate defining a flow channel through which air being detoxified is passed.

2. The device of claim 1 wherein means are provided to connect the negative lead of a high voltage direct current power supply to said ballast resistors and the positive lead thereof to said anode plate.

3. The device of claim 1 wherein said discharge units are of open, sandwich construction and are secured by means of studs and nuts for ease of inspection and replacement of faulty parts, and wherein said ballast resistors are mounted between and normal to a pair of parallel circuit boards, and said cathode pins are adjustably mounted in a pin mount unit with each pin aligned with and connected to one of said ballast resistors.

4. An electrical discharge device for the detoxification of atmospheric air, which device comprises modular, self-contained glow/corona discharge units which can be operated in parallel to achieve a flowrate dependent on the number of such paralleled units, wherein said modular discharge units are composed of sandwiched submodules modules which can be easily maintained, inspected and repaired, and wherein said discharge units are mounted on the surface of a generally cylindrically supporting structure.

5. The device of claim 4 wherein said modular discharge units comprise a plurality of ballast resistors mounted between a pair of circuit boards, a negative high voltage lead connected to one of said circuit boards, and a plurality of cathode pins connected to the other of said circuit boards, an anode connected to a positive high voltage lead, the space between said cathode pins and said anode comprising a flow channel through which the air being processed is passed.

6. A modular, self-contained glow/corona discharge unit of open, sandwich construction for ease of inspection and replacement of faulty parts comprising, a plurality of ballast resistors mounted between and normal to a pair of circuit boards, a pin mount unit comprising a plurality of adjustably mounted cathode pins, with each pin aligned with and contacting one of the terminals of a separate one of said ballast resistors, an anode plate spaced from said cathode pins to define a flow channel through which the air being processed is passed.

* * * * *